Figure 1:
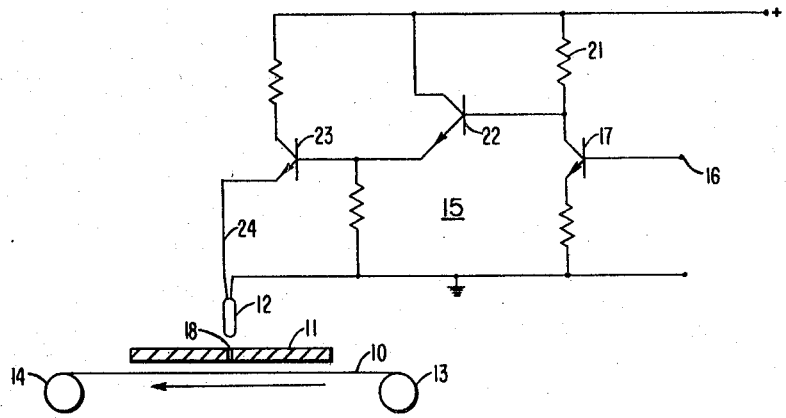

Dec. 6, 1966  C. E. WELLER  3,290,690

VARIABLE AREA RECORDING METHOD

Original Filed Jan. 21, 1963

INVENTOR:
C. E. WELLER
BY: *Theodore E. Bieber*
HIS ATTORNEY

United States Patent Office 3,290,690
Patented Dec. 6, 1966

3,290,690
VARIABLE AREA RECORDING METHOD
Charles E. Weller, Houston, Tex., assignor to Shell Oil Company, New York, N.Y., a corporation of Delaware
Original application Jan. 21, 1963, Ser. No. 252,911, now Patent No. 3,184,752, dated May 18, 1965. Divided and this application Sept. 23, 1964, Ser. No. 398,613
2 Claims. (Cl. 346—1)

This application is a division of application Serial No. 252,911, filed January 21, 1963, now Patent No. 3,184,752.

This invention pertains to recording apparatus and more particularly to an apparatus for recording a fluctuating electrical signal in the form of a variable area record.

It is often times desirable to record a fluctuating electrical signal in the form of variable area record. For example, the electrical signals obtained from seismometers or the signals obtained from detectors of acoustical logging devices are often recorded in the form of variable area records. In the past, these records have been obtained through the use of complicated optical systems and recording mirror galvanometers. These recording systems in addition to being very expensive were extremely sensitive and subject to damage as a result of the normal handling by geological surveying crews. Thus, the records from seismometers and acoustical logging detectors are often recorded in some other form originally and then re-recorded in the variable area form in a processing center at a later time. This two-step procedure increases the recording cost and in addition increases the possibility of errors in the re-recording procedures.

Accordingly, the principal object of this invention is to provide a simplified means for directly recording a fluctuating electrical signal in the form of a variable area recording.

A still further object of this invention is to provide a simple compact recording apparatus capable of recording fluctuating electrical signals in the form of variable area records.

A further object of this invention is to provide a compact recording apparatus that utilizes the phenomena of a photographic emulsion increasing the size of an image beyond the limits of the projected image when the emulsion is subject to an over-exposure in the saturation range of the emulsion.

The above objects and advantages of this invention are achieved by utilizing the phenomena of a photographic emulsion to spread beyond the boundaries of the projected image when the emulsion is over-exposed in the saturation range. The apparatus utilizes a light producing means having a controllable intensity in combination with a means for focusing the image from the light onto the photographic film. The intensity of the light is controlled in response to the fluctuation of the electrical signal that is to be recorded on the photographic emulsion. The intensity of the light means is further adjusted to exceed the saturation value of the photographic emulsion. Finally, the image projected from the light means and the photographic emulsion are moved relative to each other to produce a variable area record of the electrical signal with respect to time.

While this invention is particularly adapted for recording the electrical signals obtained from seismometers in geophysical surveys or from detectors used in acoustical well logging systems it may be used to record any fluctuating electrical signal. In addition, the electrical signals should be of relatively low frequency on the order of 500 cycles per second or less in order to obtain the most accurate results.

Figure 2:
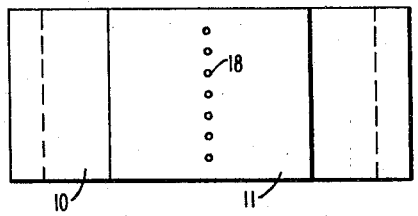
Figure 3:
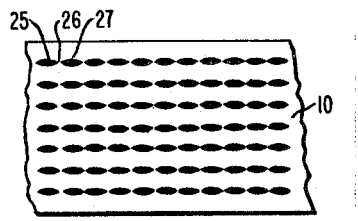

The above objects and advantages of this invention will be more easily understood from the following detailed description of a preferred embodiment when taken in conjunction with the attached drawings in which:

FIGURE 1 represents an elevation view in combination with a partial schematic wiring diagram of a preferred embodiment of this invention, FIGURE 2 illustrates a plan veiw of the apparatus shown in FIGURE 1; and FIGURE 3 illustrates a portion of a variable area record obtained utilizing the apparatus shown in FIGURES 1 and 2.

It is known that the exposure of light sensitive photographic materials such as paper film is determined by the product of the instrument light intensity and the exposure time. A typical emulsion characteristic curve wherein density is plotted against the logarithm of the exposure will exhibit a more or less linear region followed by a saturation region corresponding to the high exposure value. It is also known that although the density no longer increases with exposure in the saturation region there is a tendency of the image projected onto the film to spread beyond its normal limits. This image spreading tendency has normally been looked upon as a disadvantage of film materials especially when they are exposed in saturated regions. Thus, the normal procedure for exposing film is to operate in the linear region of the film.

This invention utilizes the image spreading tendency of a film when exposed in the saturation region to obtain a variable area record. More particularly, the intensity of the light means of this invention is controlled to produce an intensity sufficient to expose the film in the saturation region thereof. More particularly, the invention projects a circular image onto the photographic film and then varies the exposure in response to the changes in the fluctuating electrical signal. The variable exposure may be accomplished by varying the intensity of a light means in response to changes in the fluctuating electrical signal. Furthermore, the invention preferably utilizes a high contrast film to produce a record that is relatively insensitive to the development of the film.

Referring now to FIGURE 1 there is shown a recording medium 10 that is preferably a photographic material such as a film or paper. Furthermore, the recording medium 10 is preferably in a roll form so that it may be stored on a roll 13 and taken up on a roll 14 after it is exposed by a drive means not shown. Placed adjacent the recording medium 10 is a plate 11 having a series of very small openings 18. The plate 11 is preferably in intimate contact with the recording medium 10 and the openings 18 are of the type known in the photographic field as pin holes. Disposed adjacent to each of the openings 18 is a small incandescent lamp 12. Various types of small tungsten filament lights, having very low thermal time constants, are available commercially and any of these lamps may be used. The lamp 12 is coupled to an amplifying circuit 15. The circuit 15 has an input terminal 16 to which the fluctuating electrical signal is supplied. The first stage of the circuit consists of transistor 17 having its collector coupled to the positive power supply through a resistance 21. The output of the transistor stage 17 is coupled to the bulb 12 through two additional amplifying stages 22 and 23.

Referring now to FIGURE 3, there is shown a portion of a record made utilizing apparatus shown in FIGURES 1 and 2. The record shown is the type of record that is obtained when a sinusoidal signal is recorded. As is seen, the recording has a maximum width at 25 and decreases to a substantially zero width at 26 and then increases to a maximum width at 27. This type of signal clearly illustrates the general shape of a sinusoidal signal, having time the frequency of the sinusoidal signal applied at 16. By applying a direct current bias to the lamp 12, by means of the circuit 15 in FIGURE 1, one can produce output signals with the same frequency as the input signal. Of course, the length or period of the recording depends on the speed at which the film 10 is advanced.

The record shown in FIGURE 3 was obtained when subminiature tungsten filament lamps were mounted in a row ¼ inch apart, approximately 3/16 of an inch behind a series of .020 inch pin holes. The plate having pin holes was brought into contact with the photographic emulsion of film 10 and a 20 cycle per second signal supplied to the circuit 15 of FIGURE 1. It is clear that with these conditions one may easily obtain a variable area recording of the 20 cycle per second signal while a 20 cycle per second signal was used, it was possible to resolve signals to at least 100 cycles per second with the same incandescent filament bulb. Similarly, signals whose frequencies vary could easily be recorded.

From the above dimensions it is easily appreciated that a recording device capable of handling a large number of signals could be constructed in a very compact shape. For example a recording device capable of handling 32 channels as normally used in seismic exploration operations could be constructed in an easily portable arrangement. As explained the pin lights would be on ¼ inch centers, thus the total width of the recording apparatus would be approximately 8 inches and the remainder of the apparatus would occupy little additional space. In addition to these advantages the apparatus would require a minimum number of moving parts in contrast to those required in previous seismic recording devices. For example, no moving mirrors or other galvanometer parts would be required for exposing the film. In addition, the delicate bearings used in previous recording devices would also be eliminated. The only moving part would be the drive means for the film advance and this can be constructed to be substantially insensitive to shock and other abuses.

I claim as my invention:

1. A method for recording a fluctuating electrical signal to provide a variable area record of said electrical signal, said method comprising:
   producing a light having a controllable intensity;
   focusing the light into a circular image on a photographic recording medium having a saturation value exceeded by the controllable intensity of the light and confining the light image to a size that is changed significantly by the image spreading tendency of the photographic recording medium;
   moving the light relative to the photographic recording medium by moving one with respect to the other; and
   controlling the intensity of the light in accordance with the variations in the fluctuating electrical signal.

2. The method of claim 2 in which the photographic recording medium is moved relative to the light at a predetermined rate.

References Cited by the Examiner
UNITED STATES PATENTS

| 1,967,895 | 7/1934 | Marvin | 346—108 X |
| 2,532,731 | 12/1950 | Potter | 346—107 X |
| 3,069,682 | 12/1962 | Reese | 346—107 |

RICHARD B. WILKINSON, *Primary Examiner.*

LOUIS J. CAPOZI, *Examiner.*

JOSEPH W. HARTARY, *Assistant Examiner.*